Sept. 16, 1969     I. E. ZABLOTSKY ET AL     3,467,358
VIBRATOR INDICATOR FOR TURBOENGINE ROTOR BLADING
Filed Jan. 8, 1968                 4 Sheets-Sheet 1

United States Patent Office 3,467,358
Patented Sept. 16, 1969

3,467,358
VIBRATOR INDICATOR FOR TURBOENGINE ROTOR BLADING
Igor Evgenievich Zablotsky, Ukhtomskaya ulitsa 8/14, kv. 37; Jury Alexandrovich Korostelev, Ulitsa Serafimovicha 2, kv. 242; Anatoly Vasilievich Lebedev, Ulitsa Gorkogo 12, kv. 276; Lev Borisovich Sviblov, 9 Parkovaya ulitsa 61, korpus 6, kv. 21, and Efim Moiseevich Tolchinsky, Pushkinskaya ulitsa 9, kv. 55, all of Moscow, U.S.S.R.
Filed Jan. 8, 1968, Ser. No. 696,420
Int. Cl. F01d 21/00; G01p 15/00
U.S. Cl. 253—77    4 Claims

ABSTRACT OF THE DISCLOSURE

A vibration indicator for turboengine rotor blading including two non-contact electric pulse transmitters mounted on stationary parts of the turboengine near its rotor blades and displaced rotation-wise relative to each other by an amplitude of vibration which indicates either a preset or an excessive value which is to be detected. Two pulse-shaping devices are connected to the pulse transmitter and a pulse-stretcher is connected to one of the pulse-shaping devices. A gate circuit is provided which is connected to the second of the pulse-shaping devices and to the pulse-stretching device. A signaling unit is connected to the gate circuit.

---

The present invention relates to vibration indicators for turboengine rotor blading.

This vibration indicator can be used to monitor the rotor blading of compressors, aircraft engines, stationary gas turbines, steam turbines and axial compressors of various types and designations for the vibration amplitude level.

A prior art non-contact device for measuring the vibration amplitude of turboengine rotor blading is known to those skilled in the art (the U.S.S.R. Certificate of Authorship No. 160,886, dated Dec. 22, 1962, Class 42K21$_{01}$). This device affords a simultaneous CRT observation of all the turboengine rotor blades for their amplitudes of vibration.

The above-mentioned device is disadvantageous in that it does not afford the opportunity to obtain an automatic (i.e., involving no active operator) indicating signal which corresponds to a certain preset value of the amplitude level. An additional reading device is required to obtain such a signal by taking the measured values from the CRT screen and comparing the readings to a preset level.

Another disadvantage in the above-mentioned device is its dependence of the meter scale on the wheel rotation rate involving the use of tables and plots for decoding the measured values versus the rate of rotation.

These disadvantages, as well as the complexity and size of the facilities employed, limit their use to research applications.

The present invention has for its object the provision of a vibration indicator for turboengine blading which is designed to give an automatic indication of preset or excessive vibrations affecting at least one blade of the turboengine, the indications being independent of the wheel rotation rate; in addition the vibration indicator should be sufficiently simple and small for use on a turboengine in actual operation.

A specific object of the present invention resides in the provision of a vibration indicator comprising:

two non-contact electric pulse transmitters mounted on stationary parts of the turboengine near its blades and displaced rotation-wise relative to each other by a certain amplitude which is indicative of a preset or excessive level to be indicated by the vibration indicator, and a gate circuit which has one of its inputs connected to the first pulse transmitter through a pulse shaper, the other input being connected to the second transmitter through a pulse shaper and a pulse stretcher, while the gate circuit output is connected to a signaling unit and a recording unit.

In one form of the present invention the first non-contact electric pulse transmitter is mounted at the blade root, the second pulse transmitter being disposed in the turboengine casing near the blade periphery.

In another form of the present invention, the dismantling of the turboengine can be simplified by arranging for both non-contact pulse transmitters to be mounted in the casing near the blade periphery, the second pulse transmitter being displaced rotation-wise by at least one blade pitch.

In order to indicate torsional vibrations, both non-contact pulse transmitters should be mounted in the casing near the blade periphery, the first transmitter being disposed near one of the edges, the second transmitter being disposed near the other edge.

The vibration indicator of this type, if mounted, for instance, on aircraft engines can give the pilot an automatic indication of maximal permissible amplitudes of vibration which arise on turboengine blades, warning him of an undesirable performance of the engine. In addition, the vibration indicator is simple in manufacture and can be mounted on the turboengine without dismantling the latter.

These and other objects and advantages of the present invention will be apparent from the following description of illustrative embodiments of this invention and attached drawings thereof, in which.

Figure 1:
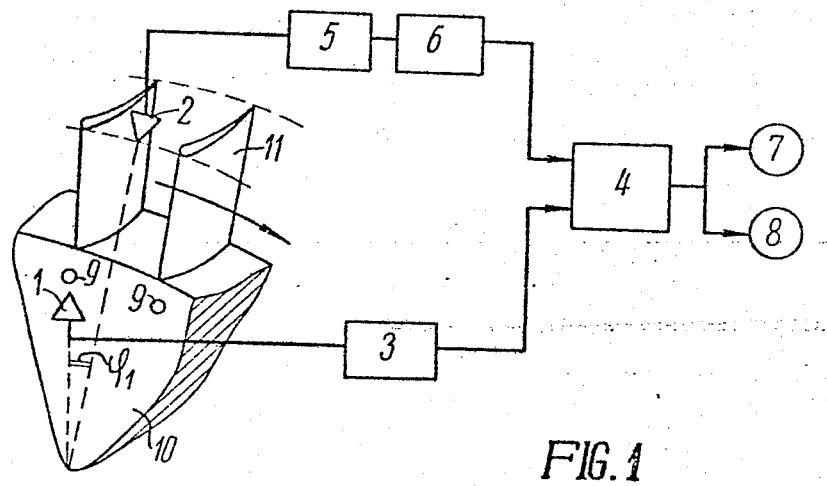
FIGURE 1 is a block-diagram of the vibration indicator, in accordance with the present invention, and an arrangement of non-contact electric pulse transmitters, in which the vibration indicator signals excessive vibrations of the blading relative to the wheel disc.

A block-diagram of the vibration indicator is shown in FIG. 1. The vibration indicator comprises two non-contact electric pulse transmitters 1 and 2 which are mounted on stationary parts of the turboengine. The first transmitter 1 (counted rotation-wise) is connected to one of the inputs of a gate circuit 4 through a pulse shaper 3 while the second transmitter 2 (counted rotation-wise) is connected to the other input of the gate circuit 4 through a pulse shaper 5 and a pulse stretcher 6. The gate circuit 4 output is fed to a signaling unit 7 and a recording unit 8.

A buzzer or a signal lamp can be used as the signaling unit 7 while a loop oscillograph or a magnetic tape recorder can be employed as the recording unit.

The pulse transmitters 1 and 2 can be arranged, for instance, in the manner shown in FIG. 1. The first pulse transmitter 1 is attached opposite blade marks 9 which can be implemented, by way of an example, either as pins or recesses on a rotor disc 10 or on any other disc fixed on the same shaft as the rotor. The angular pitch of blade marks 9 is equal to that of blade marks II. The second pulse transmitter 2 is attached above the peripheral sections of blades II and displaced rotation-wise relative to the first transmitter by an angle of $\varphi_1$. The value of the angular displacement, $\varphi_1$, will be determined from the following equation:

$$\varphi_1 = \frac{2\pi n}{z} + \frac{A_1}{R}$$

where $z$ is the number of rotor blades, $n = 0, 1, 2, \ldots$ $R$ is an external radius of the rotor, and $A_1$ is an indicated vibration amplitude of the blade edges in relation to the root sections.

Figure 2:
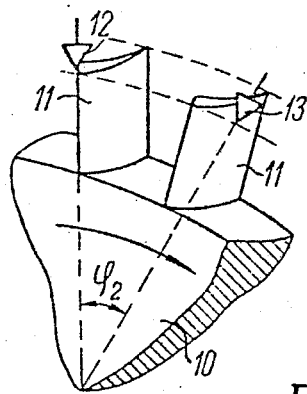
FIGURE 2 is an arrangement of pulse transmitters in which, in accordance with the present invention, the vibration indicator signals an amplitude of interacting vibrations of the blading.

Another installation arrangement of the pulse transmitters is shown in FIG. 2. Both pulse transmitters 12 and 13 are mounted in the turboengine casing above blades II and in the same plane which is normal to the turboengine axis, the angular pitch between the transmitters being determined from the equation $$\varphi_2 = \frac{2\pi n}{z} + \frac{A_2}{R}$$

where $A_2$ is an indicated amplitude of interacting blade vibrations, $n = 1, 2, 3, \ldots z-1$ In this embodiment the pulse transmitter 12 is connected to the input of the pulse shaper 3 (see FIG. 1) while the transmitter 13 (see FIG. 2) is connected to the input of the pulse shaper 5 (see FIG. 1).

Figure 3:
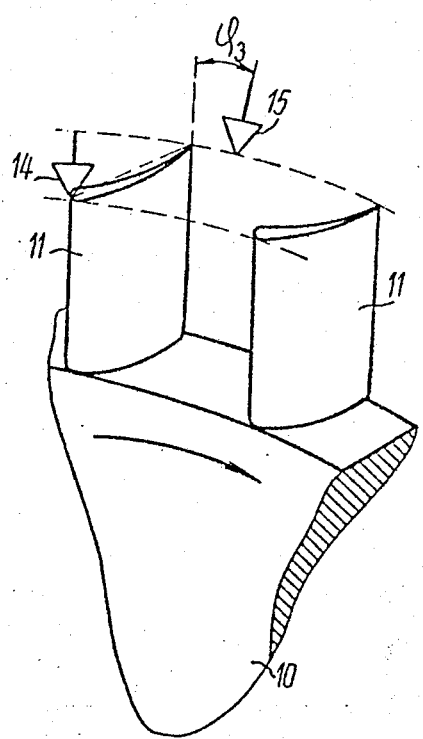
FIGURE 3 is an arrangement of pulse transmitters in which, in accordance with the present invention, the vibration indicator signals the amplitude of torsional vibrations of the blading.

Still another installation arrangement of pulse transmitters is shown in FIG. 3. The pulse transmitters 14 and 15 are mounted above the peripheral section of the blade: the first transmitter is attached at the near edge while the second transmitter is disposed at the far edge so that the angular pitch therebetween, $\varphi_3$, will be determined from the equation $$\varphi_3 = \frac{A_3}{R}$$

where $A_3$ is an indicated amplitude of torsional vibrations. In this embodiment the pulse transmitter 14 is connected to the input of the pulse shaper 3 (see FIG. 1), while the pulse transmitter 15 (see FIG. 3) is connected to the input of the pulse shaper 5 (see FIG. 1).

Figure 4:
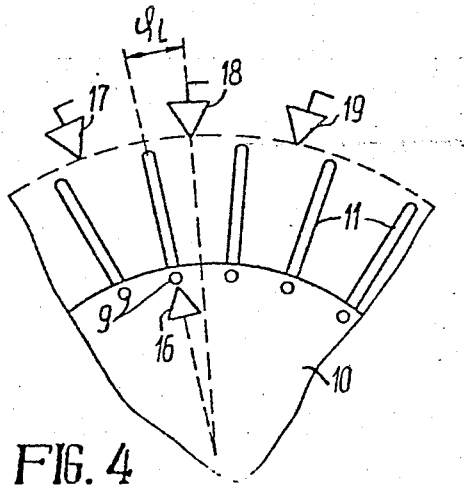
FIGURE 4 is an arrangement of pulse transmitters in which, in accordance with the present invention, the vibration indicator signals a plurality of vibration amplitude levels of the blading.

Referring to FIG. 4, an installation arrangement of the pulse transmitters disclosed herein is designed to indicate a plurality of vibration amplitude levels. The pulse transmitter 16 is attached opposite the root marks 9, while transmitters 17, 18, 19, etc., are disposed opposite peripheral sections of the blades and displaced relative to the pulse transmitter 16 by a certain angle which will be determined from the following equation $$\varphi_i = \frac{2\pi n}{z} + \frac{A_i}{R}$$

where $A_i$ is the $i^{th}$ indicated amplitude of blade vibrations.

This vibration indicator can also operate with various pairs of transmitters mounted opposite blade peripheral sections.

Known types of variable inductors and variable capacitors can be made use of as non-contact pulse transmitters.

Figure 5:
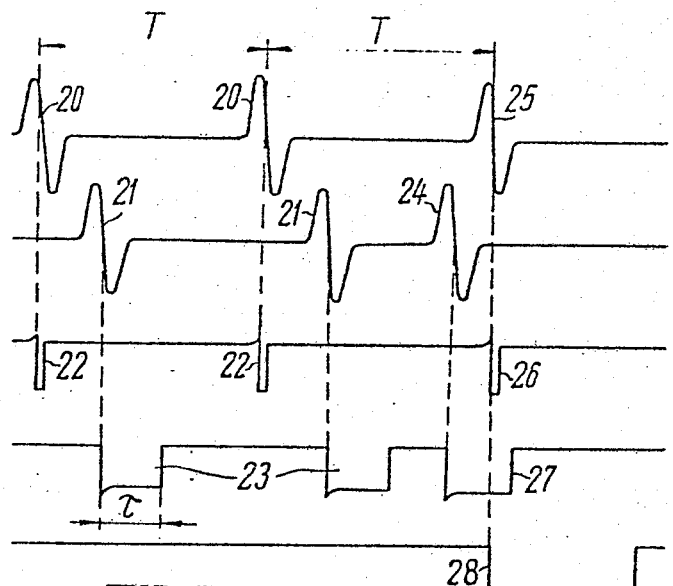
FIGURE 5 is a time diagram of the vibration indicator performance, in accordance with the present invention.

The operation of the vibration indicator as shown in FIG. 1 can be further explained by means of a time diagram in FIG. 5. Whenever the transmitter 1 passes by blade marks 9, it generates electric pulses 20, the pulse repetition period $T$ being equal to the period of blade rotation. Whenever blades II pass by the pulse transmitter 2, it also generates electric pulses 21 which have the same repetition period.

By means of the pulse shaper 3 pulses 20 from the first transmitter 1 are shaped into short pulses 22 which coincide with pulses 20 at the zero level while pulses 21 from the second transmitter 2 are shaped into long pulses 23 by means of the pulse shaper 5 and pulse stretcher 6, their leading edges coinciding with pulses 21 at the zero level. The length of the long pulse $\tau$ is selected to be less than the minimal possible value of the repetition period $T$.

In the absence of vibrations, the pulses 20 and 21 do not coincide with each other due to the initial displacement angle $\varphi$ between the two pulse transmitters, and the gate circuit does not generate any output signal. Whenever vibrations arise the pulses from the second transmitter 2 are phase-modulated. Whenever the amplitude of vibration becomes equal to or exceeds a preset value of at least one blade, the pulses 24 from the second transmitter 2 will either coincide with, or lead the pulses 25 from the first transmitter. In this case long and short pulses will sometimes coincide as shown, for instance, with reference to the pulses 26 and 27.

At these moments the gate circuit 4 will open generating the pulse 28 for the signaling unit 7 and recording unit 8.

Other installation arrangements of the transmitters, like those shown in FIGS. 2 and 3, enable the vibration indicator to operate in a manner which is similar to that described above.

Figure 6:
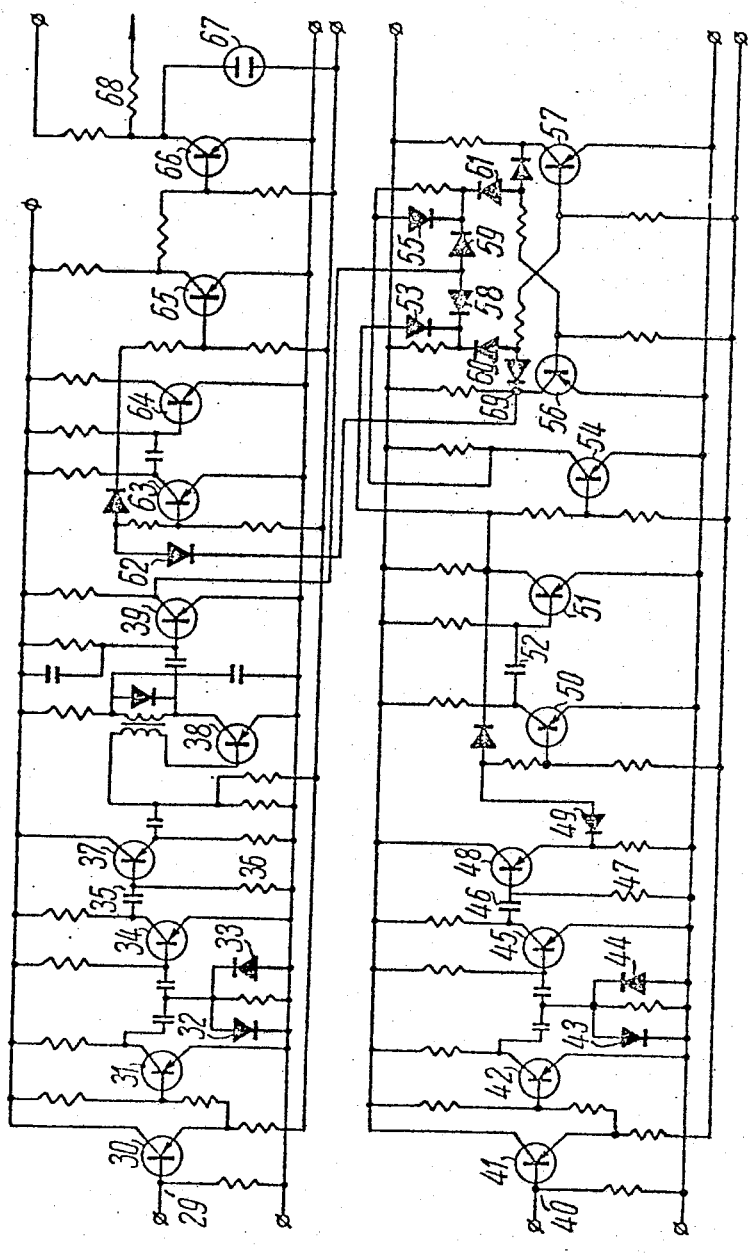
FIGURE 6 is a basic electrical circuit of the vibration indicator, in accordance with the present invention.

An embodiment of the basic electrical diagram for this vibration indicator is shown in FIG. 6. The instrument makes use of transistors. The transmitter 1 (see FIG. 1) is connected to the pulse shaper which has an emitter follower at the input 29 (see FIG. 6) employing a transistor 30. The signal is then amplified by a transistor 31. Diodes 32 and 33 are used as amplitude limiters. The transistor 34 is a limiting amplifier. Through a differential circuit comprising capacitor 35 and resistor 36, the pulses are fed to an emitter follower employing a transistor 37. The transistor emitter 37 is connected to the blocking oscillator input (transistor 38) which shapes short pulses. A transistor 39 is used as an intermediate amplifier generating negative output pulses for driving the gate circuit.

The transmitter 2 is connected to the input 40 of the second channel pulse shaper (see FIG. 1). The pulse shaping circuit of this channel is similar to that described above: an emitter follower employing a transistor 41, an amplifier 42, diode limiters 43 and 44, a limiting amplifier employing a transistor 45, differential circuits 46 and 47 and an emitter follower employing a transistor 48. A pulse stretcher employing transistors 50 and 51 is a one-shot multivibrator which is connected to the output of the transistor 48 through the diode 49. The required pulse length is assigned to the pulse stretcher by the variable capacitor 52. The pulse stretcher output is fed to the gate circuit directly through a diode 53, an invertor 54 and a diode 55.

The gate circuit comprises two crystal diode valves which are connected to the inputs of a flip-flop.

The flip-flop employs transistors 56 and 57, and crystal diode valves employ diodes 53, 58 and 55, 59. An output diode of the first valve is connected to one of the flip-flop inputs, while an output diode 61 of the second valve is connected to the second flip-flop input.

The flip-flop will assume either 1 or 0 state depending on the specific valve which is open at the moment. The flip-flop output is fed to the one-shot employing transistors 63 and 64 through a diode 62. From the transistor 64, pulses of increased duration are fed to an amplifier employing transistors 65 and 66. The amplifier output is connected to a signaling lamp 67, the recording unit obtaining the output via a resistor 68. The chosen pulse length of the one-shot multivibrator employing transistors 63 and 64 is sufficiently great to afford a visual indication by means of signaling lamp flashes.

In the absence of vibrations, the transmitter pulses come at equal intervals being phase-shifted relative to each other. On leaving the shaping channel the pulses are fed to the crystal diode valves to be compared there as per time characteristics. Whenever coincidence is not obtained the diode crystal valve employing diodes 55 and 59 opens setting the flip-flop to the O state. The output 69 potential becomes then equal to zero.

In the presence of vibrations, the pulses are phase-modulated, and whenever the amplitude values exceed a preset value the angular displacement becomes so great that the negative pulse from the pulse stretcher (the transistor 51 collector) will coincide with the short pulse from the blocking oscillator (the transistor 38 collector). As a result the crystal valve employing diodes 53, 58 will open, the flip-flop assuming the state of I. The flip-flop output will then become negative driving the one-shot multivibrator employing transistors 63 and 64. The transistor 65 will open and the transistor 66 will cut off, the latter giving rise to a negative collector voltage which is sufficiently great to operate the lamp 67. Since the neon signaling lamp 67 requires a voltage of over 70 v., the output transistor 66 is to employ a crystal triode with higher admissible collector voltages.

What we claim is:

1. A vibration indicator for turboengine rotor blading comprising two non-contact electric pulse transmitters mounted on stationary parts of the turboengine near its rotor blades and displaced rotation-wise relative to each other by an amplitude of vibration indicative of a preset or an excessive value to be signalled; two pulse-shaping means each including inputs connected to one of said pulse transmitters and further including outputs; a pulse stretching means including an input connected to the output of the first of said pulse-shaping means; a gate circuit including an output and further including a first input connected to the output of the second of said pulse-shaping means and a second input connected to the output of said pulse stretching means; and a signaling unit connected to the output of said gate circuit.

2. A vibration indicator according to claim 1, wherein one of said electric pulse transmitters is mounted near the blade root and the second said transmitter is mounted in the turboengine casing near the blades periphery.

3. A vibration indicator according to claim 1, wherein both said non-contact electric pulse transmitters are mounted near the blade periphery, the second said transmitter being displaced rotation-wise by at least one blade pitch.

4. A vibration indicator according to claim 1, wherein both said pulse transmitters are mounted at the blade periphery, one of the transmitters being attached near one of the blade edges the other transmitter being attached near the other blade edge.

References Cited
UNITED STATES PATENTS 2,677,273  5/1954  Johnson _____ 253—59 X
2,745,969  5/1956  Keller _____ 253—1 X EVERETTE A. POWELL, Jr., Primary Examiner U.S. Cl. X.R.

253—1, 39